United States Patent
Di Pietro et al.

(10) Patent No.: US 10,498,752 B2
(45) Date of Patent: Dec. 3, 2019

(54) ADAPTIVE CAPTURE OF PACKET TRACES BASED ON USER FEEDBACK LEARNING

(71) Applicant: Cisco Technology, Inc., San Jose, CA (US)

(72) Inventors: Andrea Di Pietro, Lausanne (CH); Jean-Philippe Vasseur, Anchorage, AK (US); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 15/211,145

(22) Filed: Jul. 15, 2016

(65) Prior Publication Data
US 2017/0279835 A1  Sep. 28, 2017

Related U.S. Application Data

(60) Provisional application No. 62/313,981, filed on Mar. 28, 2016.

(51) Int. Cl.
| | |
|---|---|
| *G06F 21/00* | (2013.01) |
| *H04L 29/06* | (2006.01) |
| *G06N 5/04* | (2006.01) |
| *G06N 20/00* | (2019.01) |
| *H04L 12/26* | (2006.01) |
| *H04L 12/24* | (2006.01) |

(52) U.S. Cl.
CPC ......... *H04L 63/1425* (2013.01); *G06N 5/043* (2013.01); *G06N 20/00* (2019.01); *H04L 41/147* (2013.01); *H04L 43/024* (2013.01); *H04L 43/062* (2013.01); *H04L 43/14* (2013.01); *H04L 63/02* (2013.01); *H04L 63/145* (2013.01); *H04L 63/1458* (2013.01); *H04L 2463/144* (2013.01)

(58) Field of Classification Search
CPC . H04L 63/1425; H04L 41/147; H04L 43/062; H04L 63/145; H04L 63/02; H04L 43/14; H04L 43/024; H04L 63/1458; H04L 2463/144; G06N 99/005; G06N 5/043
See application file for complete search history.

(56) References Cited

U.S. PATENT DOCUMENTS

| | | |
|---|---|---|
| 8,045,464 B1 | 10/2011 | Nucci et al. |
| 8,191,139 B2 | 5/2012 | Heimerdinger et al. |
| 8,887,286 B2 | 11/2014 | Dupont et al. |
| 9,219,886 B2 * | 12/2015 | Sooy .................. H04N 7/18 |
| 9,237,161 B2 | 1/2016 | Humble et al. |

(Continued)

OTHER PUBLICATIONS

Park et al. "Optimal Stop Points for Data Gathering in Sensor Networks with Mobile Sinks" Wireless Sensor Network, 2012, pp. 1-10.

*Primary Examiner* — Lisa C Lewis
(74) *Attorney, Agent, or Firm* — Behmke Innovation Group LLC; James M. Behmke; Stephen D. LeBarron

(57) ABSTRACT

In one embodiment, a node in a network detects an anomaly in the network based on a result of a machine learning-based anomaly detector analyzing network traffic. The node determines a packet capture policy for the anomaly by applying a machine learning-based classifier to the result of the anomaly detector. The node selects a set of packets from the analyzed traffic based on the packet capture policy. The node stores the selected set of packets for the detected anomaly.

20 Claims, 11 Drawing Sheets

(56) References Cited

U.S. PATENT DOCUMENTS

| | | | |
|---|---|---|---|
| 9,256,862 B2* | 2/2016 | Lai | G06Q 10/107 |
| 9,276,948 B2 | 3/2016 | Hitt et al. | |
| 9,398,043 B1* | 7/2016 | Yang | H04L 63/1441 |
| 2006/0047617 A1* | 3/2006 | Bacioiu | G06K 9/6262 |
| | | | 706/59 |
| 2010/0031156 A1 | 2/2010 | Doyle et al. | |
| 2010/0071024 A1* | 3/2010 | Eyada | H04L 63/0263 |
| | | | 726/1 |
| 2010/0162399 A1 | 6/2010 | Sheleheda et al. | |
| 2013/0298220 A1* | 11/2013 | Yoon | H04L 63/0245 |
| | | | 726/12 |
| 2014/0013221 A1 | 1/2014 | Zheng et al. | |
| 2014/0090061 A1* | 3/2014 | Avasarala | G06F 21/56 |
| | | | 726/24 |
| 2015/0033084 A1 | 1/2015 | Sasturkar et al. | |
| 2015/0033086 A1 | 1/2015 | Sasturkar et al. | |
| 2016/0028763 A1* | 1/2016 | Cruz Mota | H04L 63/1416 |
| | | | 726/23 |
| 2016/0269442 A1* | 9/2016 | Shieh | H04L 63/20 |
| 2016/0308905 A1* | 10/2016 | Stiekes | H04L 47/20 |
| 2016/0330111 A1* | 11/2016 | Manghirmalani | H04L 43/028 |
| 2017/0092014 A1* | 3/2017 | Perlman | G06T 19/20 |
| 2017/0195355 A1* | 7/2017 | Wang | H04L 63/1425 |

* cited by examiner

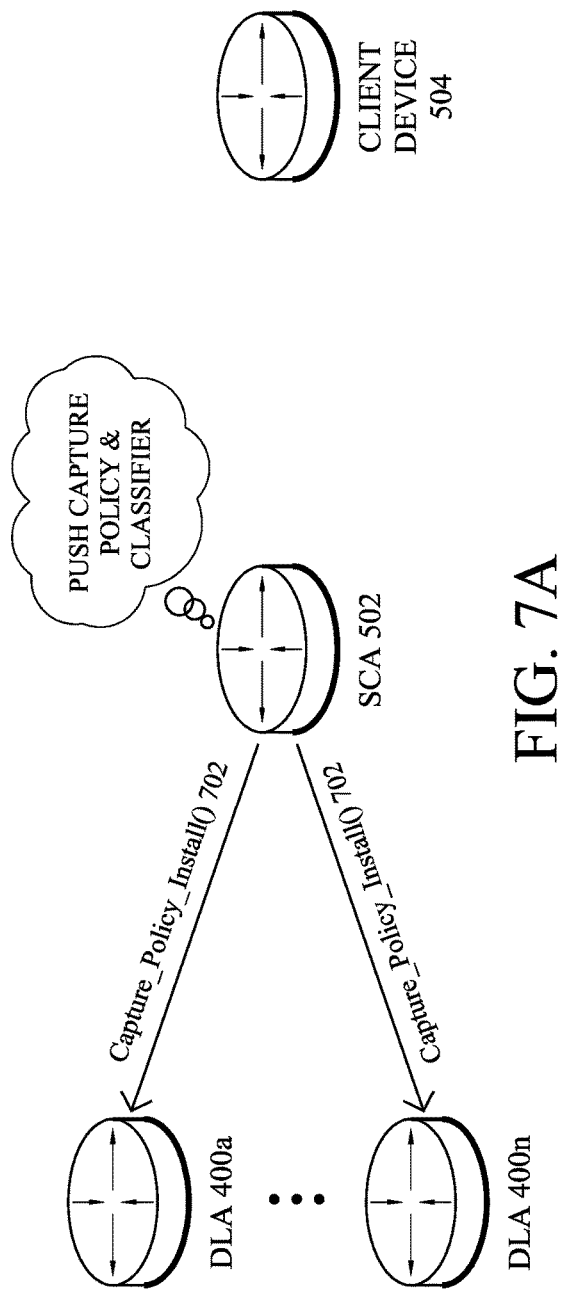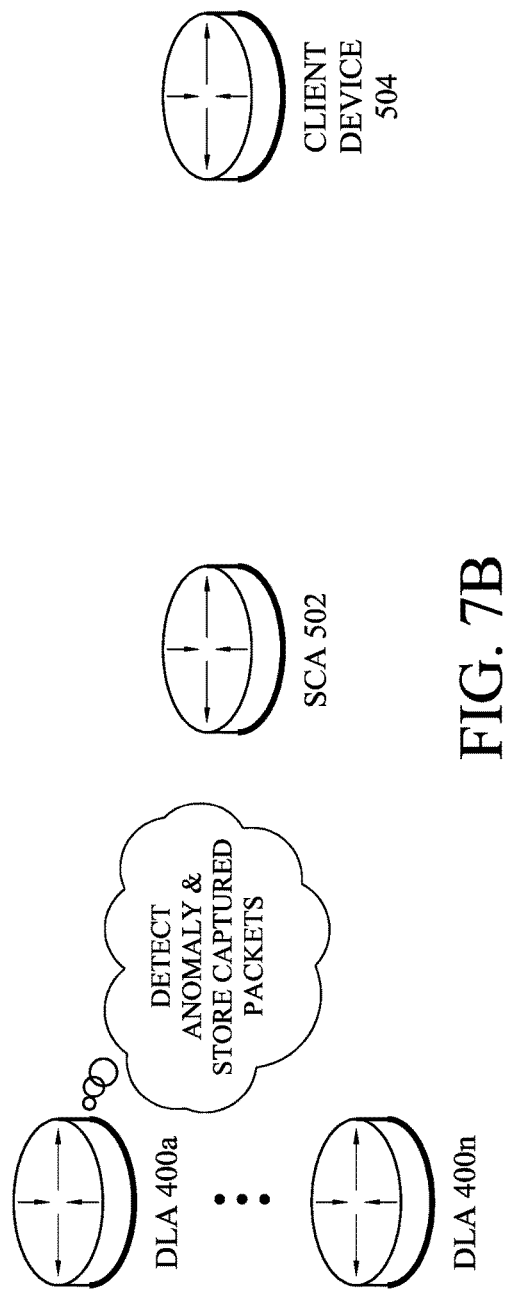
FIG. 7A
FIG. 7B

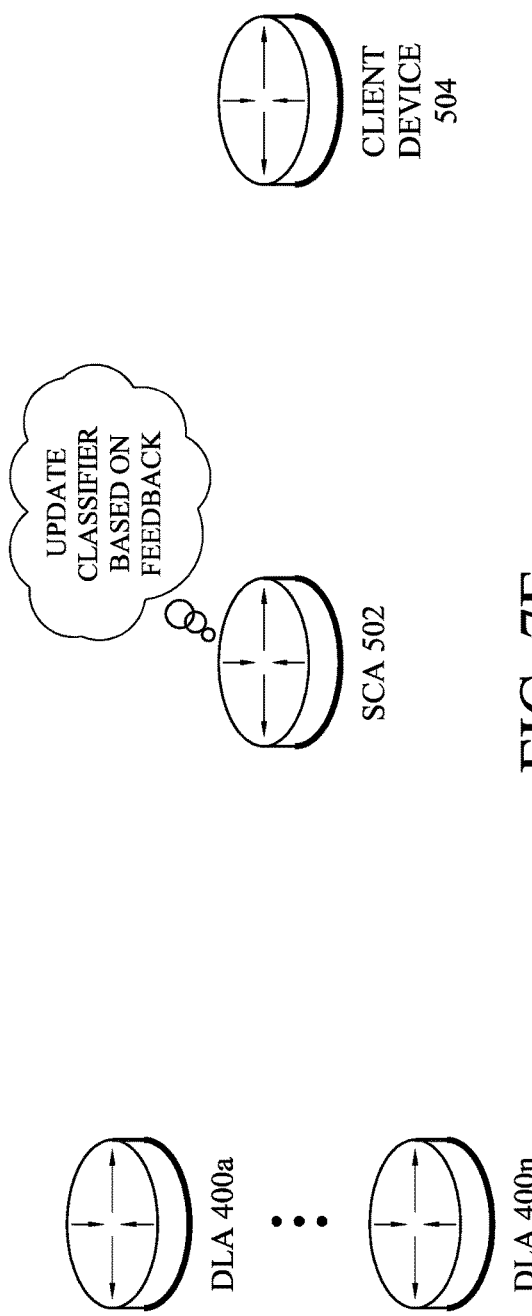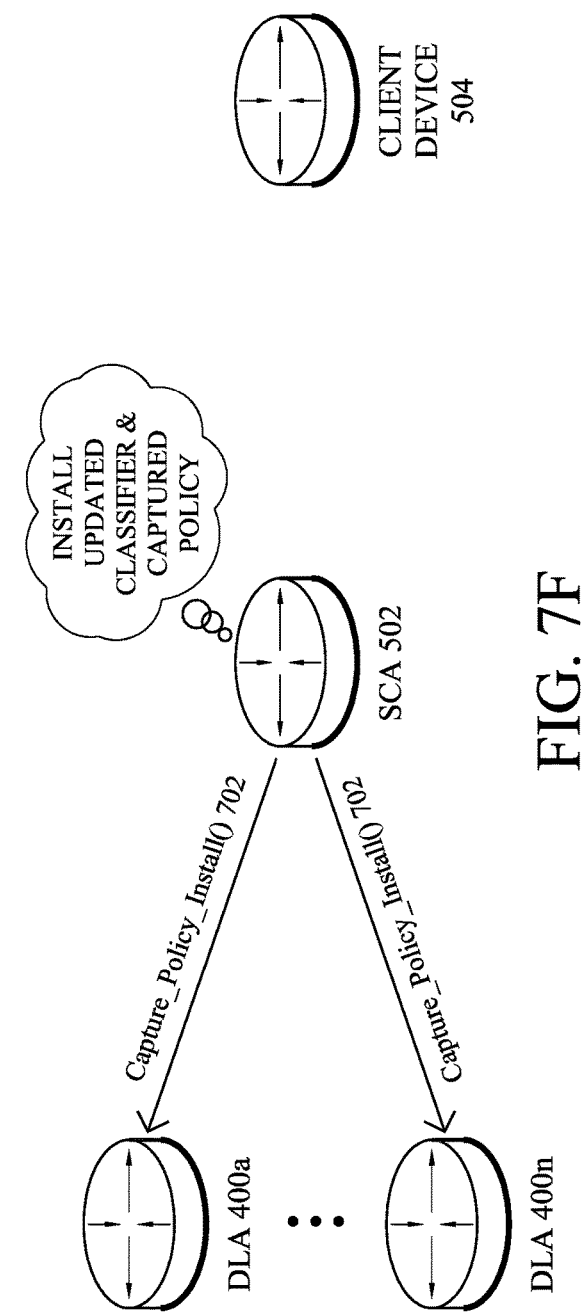

ADAPTIVE CAPTURE OF PACKET TRACES BASED ON USER FEEDBACK LEARNING

RELATED APPLICATION

This application claims priority to U.S. Provisional Application No. 62/313,981, filed on Mar. 28, 2016, entitled "USER ASSISTANCE COORDINATION IN ANOMALY DETECTION," by Vasseur, et al., the contents of which are incorporated herein by reference.

TECHNICAL FIELD

The present disclosure relates generally to computer networks, and, more particularly, to the adaptive capture of packet traces based on user feedback learning.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7A-7F illustrate examples of feedback regarding a packet capture policy;

DESCRIPTION OF EXAMPLE EMBODIMENTS

Overview

Figure 1A:
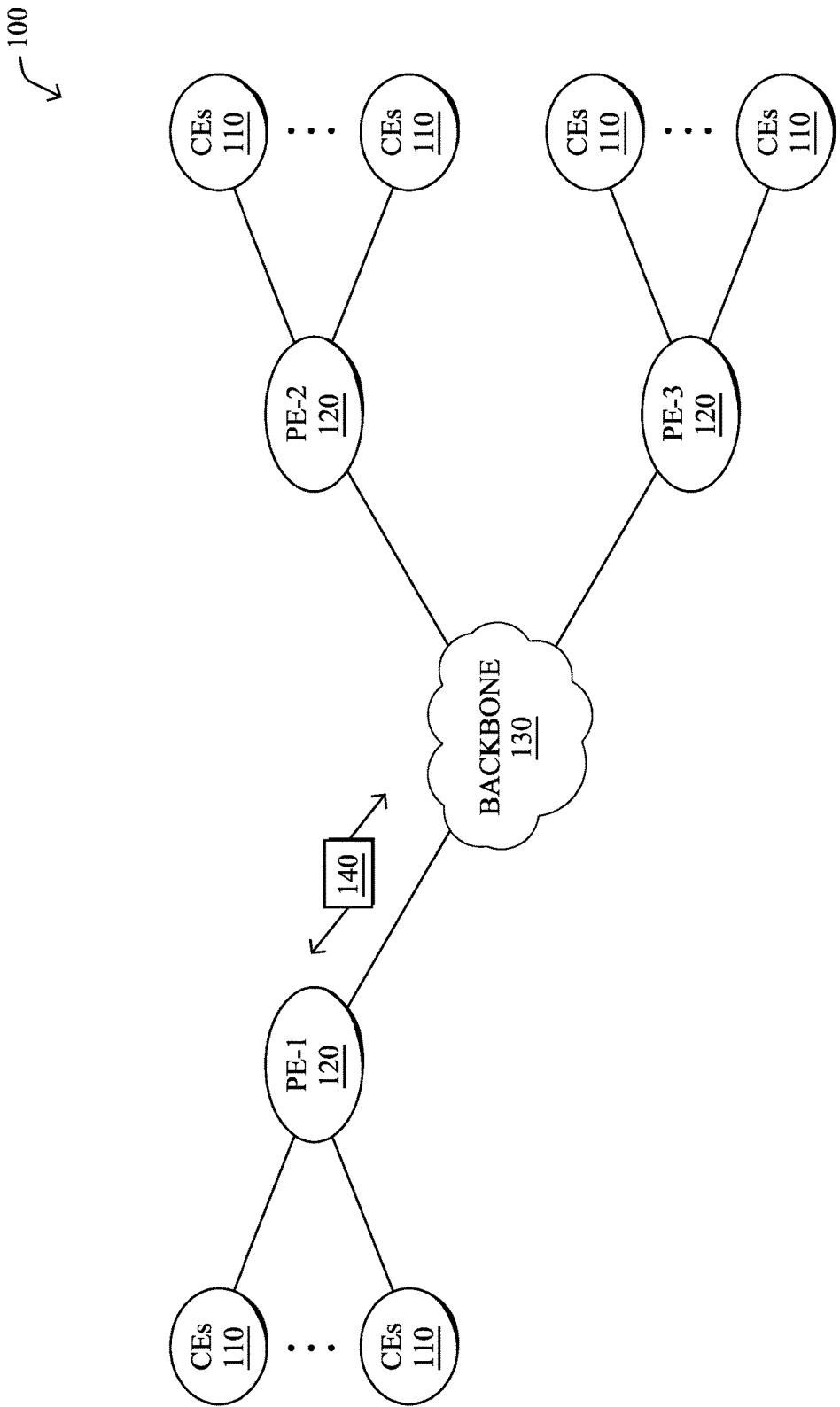
FIGS. 1A-1B illustrate an example communication network.

According to one or more embodiments of the disclosure, a node in a network detects an anomaly in the network based on a result of a machine learning-based anomaly detector analyzing network traffic. The node determines a packet capture policy for the anomaly by applying a machine learning-based classifier to the result of the anomaly detector. The node selects a set of packets from the analyzed traffic based on the packet capture policy. The node stores the selected set of packets for the detected anomaly.

In further embodiments, a supervisory device in a network provides, to a user interface, captured packets and a first packet capture policy that are associated with a network anomaly detected by a node in the network that analyzes network traffic using a machine learning-based anomaly detector. The supervisory device receives feedback for the captured packets and the first packet capture policy. The supervisory device trains a machine learning-based classifier to determine a second packet capture policy based in part on the received feedback. The supervisory device sends the trained classifier to the node. The node is configured to use the classifier to select packets for storage based on the second packet capture policy as determined by applying the classifier to a result of the anomaly detector.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
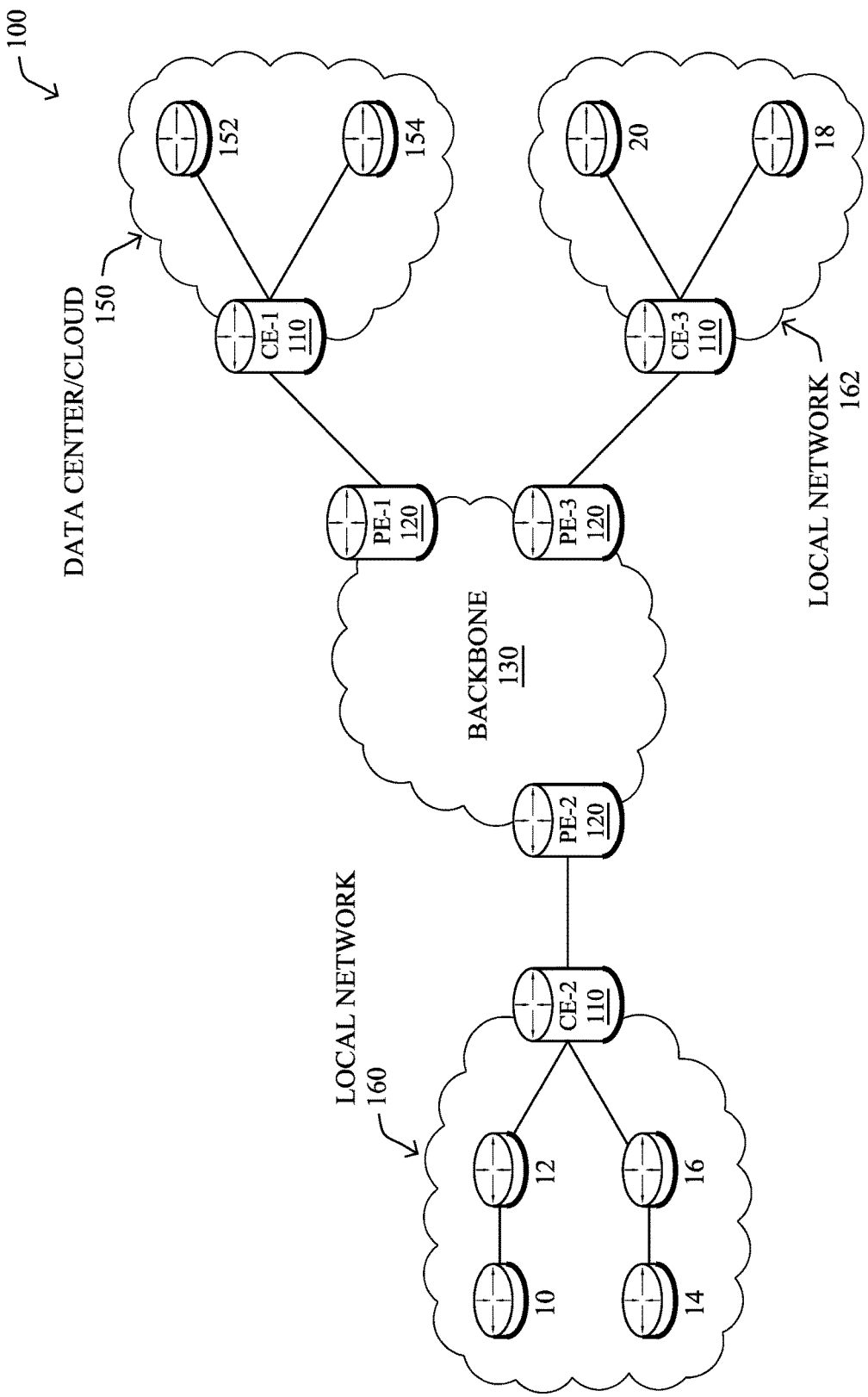

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
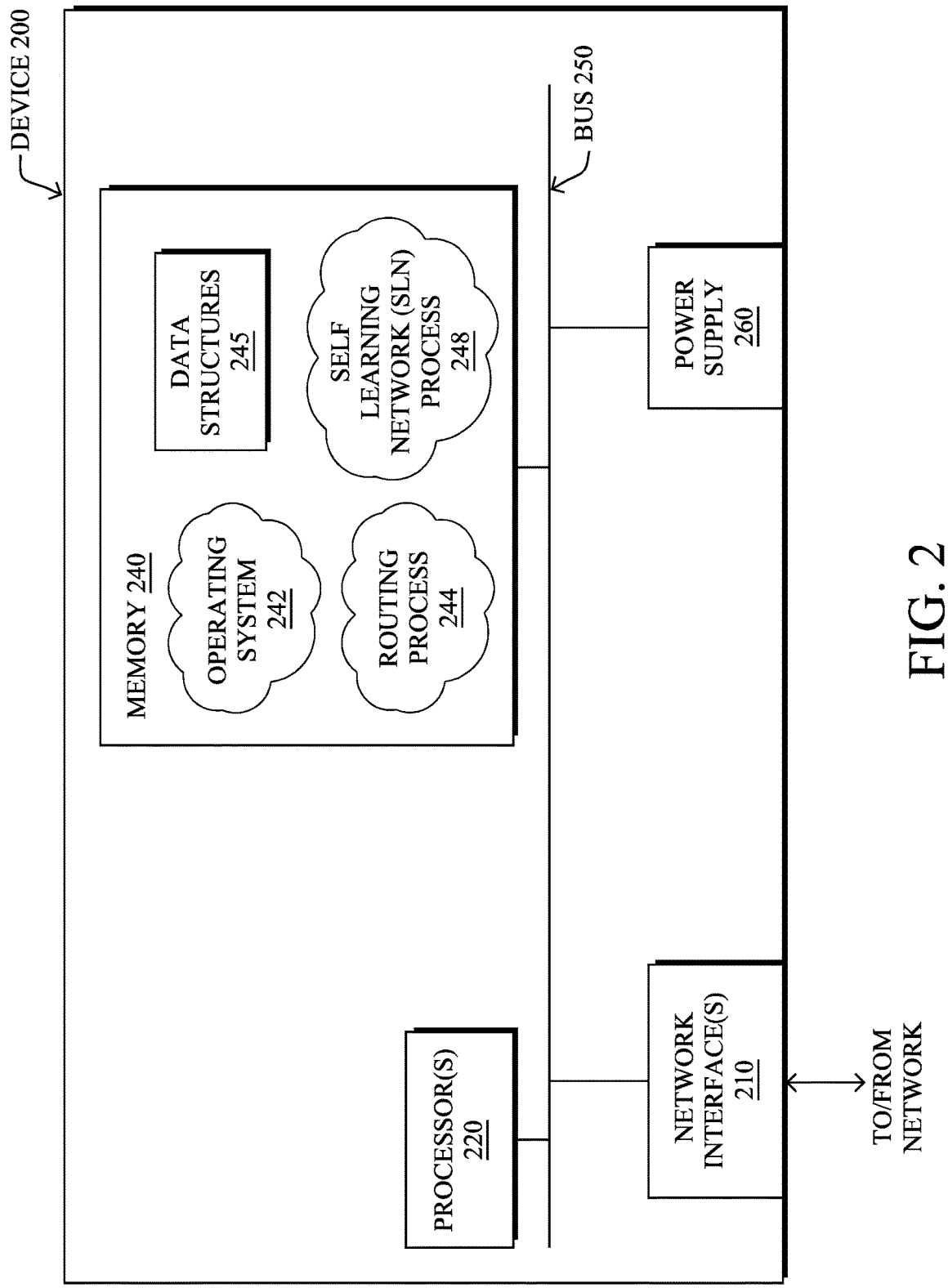
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space.

Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
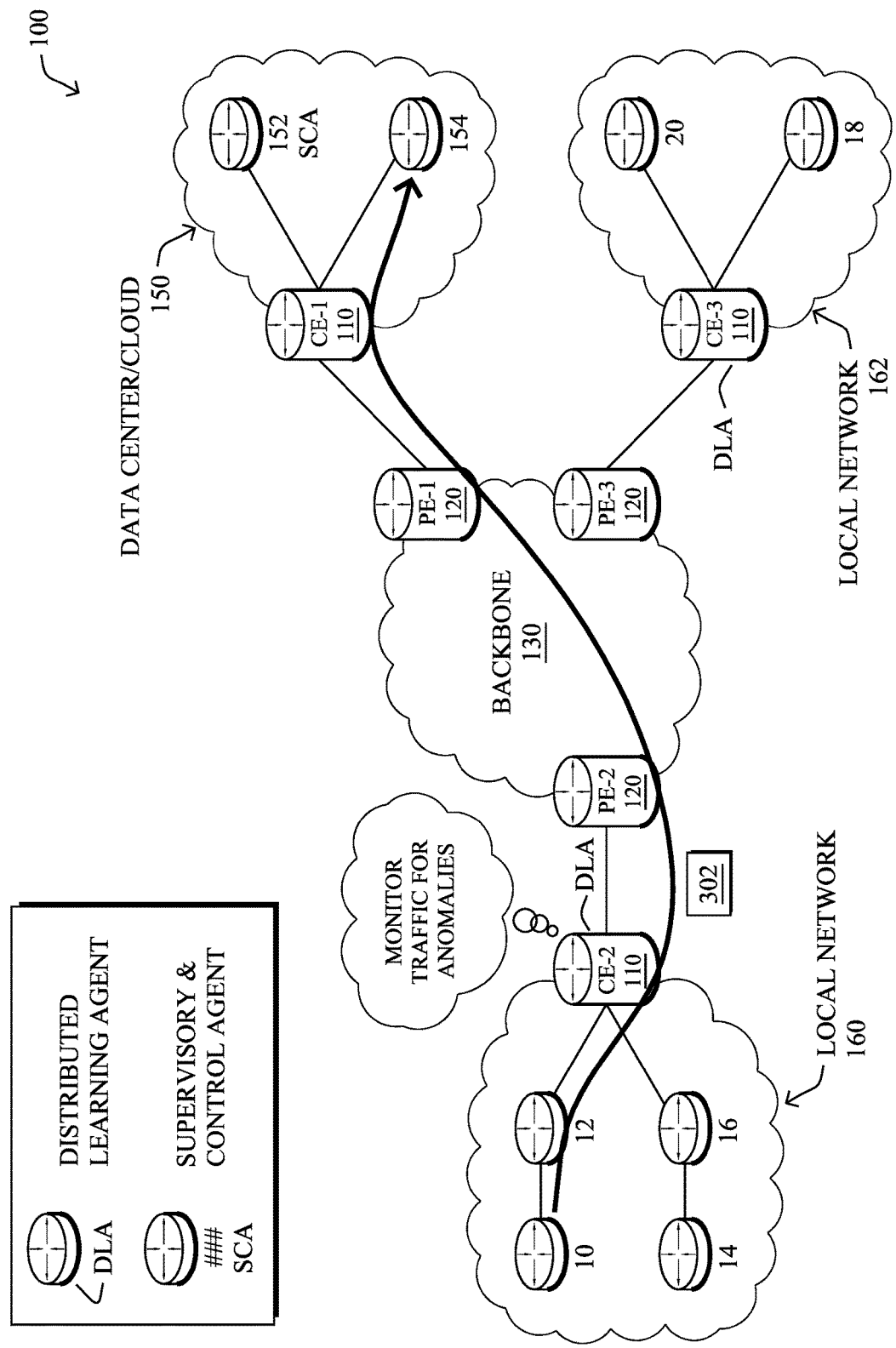
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
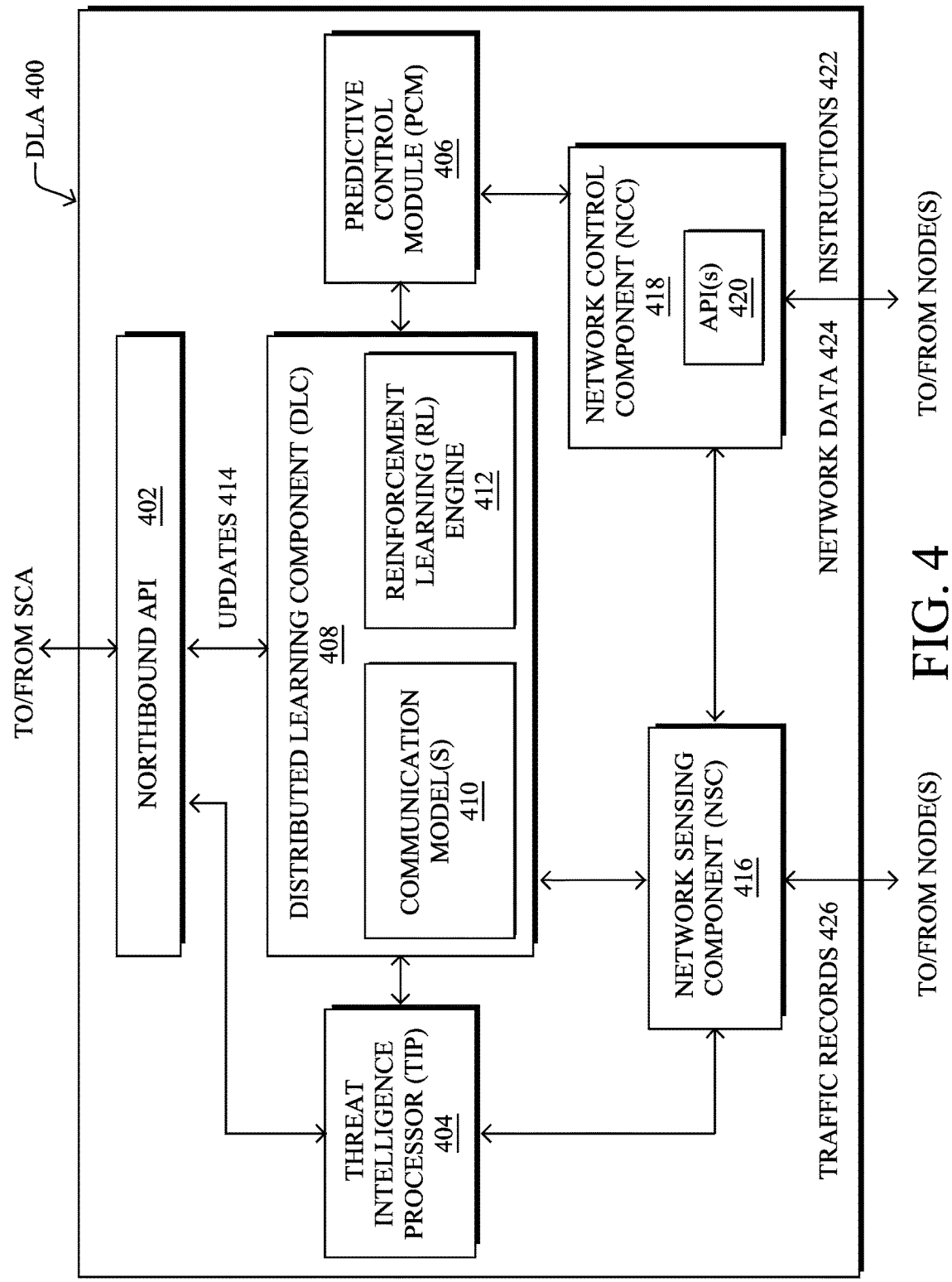
FIG. 4 illustrates an example distributed learning agent (DLA)

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As mentioned above, anomaly detection systems can detect anomalies in large scale networks by analyzing features on edge sensors (e.g., DLAs) and export detection results to a central controller (e.g., an SCA). Such results can include contextual information (e.g., involved IPs, applications, etc.) about the anomaly which can be used by an analyst to understand the anomalous behavior. However, such information is sometimes not sufficient for a total understanding of the phenomenon. In several cases, an actual trace containing the anomalous packets can give very valuable information for forensics. However, providing actual packet traces can conflict with the resource limitations of a real time system, which cannot indefinitely store captured traffic until explicitly requested by the user. This is especially true in high speed networks where storing large packet captures would have a prohibitive memory footprint.

One approach to packet captures would be to store in memory only the packets that are associated with traffic flows suspected to be anomalous (e.g., which are locally flagged as being anomalous and for which user confirmation is pending). While this approach would certainly limit the memory footprint, it does not guarantee that all of the relevant information is kept. Notably, in some cases, only one part of the anomalous activity has been flagged by the anomaly detector. For example, in the case of network scanning activity, the scanning traffic may be flagged as anomalous while the traffic that the source sends to one of the scanned targets may be considered as legitimate. In such a case, keeping only the information for the anomalous flows would result in discarding the other relevant traffic. In other cases, traffic which is not by itself anomalous may be kept for its contextual value. For example, for a server participating in an exfiltration, it may be interesting to store all of the received DNS traffic, not just the packets belonging to the anomalous flows.

Adaptive Capture of Packet Traces Based on User Feedback Learning

The techniques herein provide a mechanism that allows for the storage of only the portion of a packet trace that is relevant for a particular anomaly. Since understanding the type of traffic that is relevant depends on the anomaly type and requires expert knowledge, the techniques herein learn the relationship between the type of detected anomaly and the required contextual traffic. Said differently, a goal of the techniques herein is to provide a capture of the traffic trace that is relevant to a particular anomaly, without the need to store and send all of the captured traffic to the user. In some aspects, user feedback is leveraged to train a model which defines a packet capture policy for every type of detected anomaly. After an anomaly is detected, the DLAs use one or more models to choose a proper capture policy and only store the packets which the user considers as relevant, based on the chosen policy.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Specifically, in various embodiments, a node in a network detects an anomaly in the network based on a result of a machine learning-based anomaly detector analyzing network traffic. The node determines a packet capture policy for the anomaly by applying a machine learning-based classifier to the result of the anomaly detector. The node selects a set of packets from the analyzed traffic based on the packet capture policy. The node stores the selected set of packets for the detected anomaly.

Figure 5:
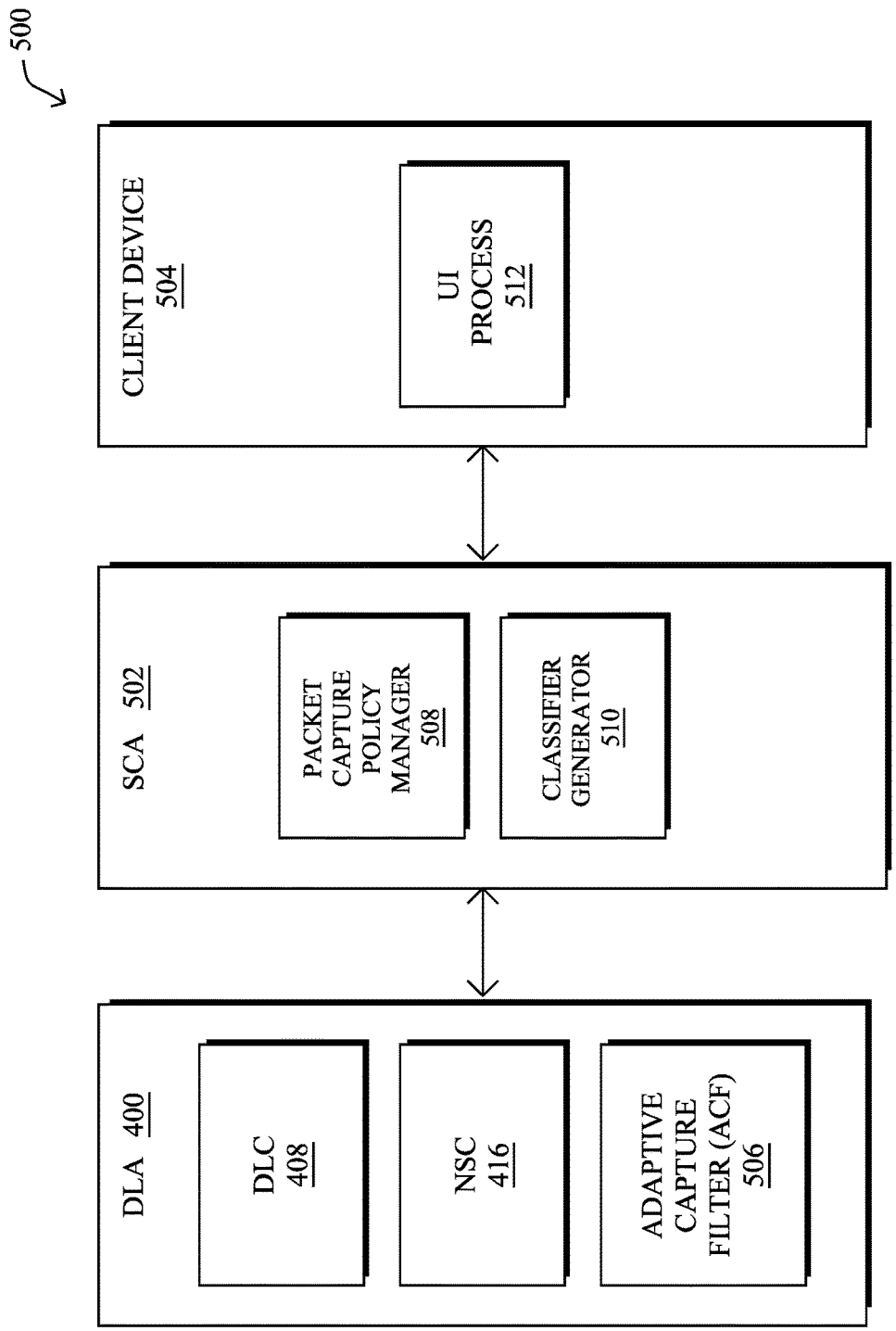
FIG. 5 illustrates an example architecture for implementing adaptive packet capture in an SLN.

Operationally, FIG. 5 illustrates an example architecture 500 for implementing adaptive packet capture in an SLN, according to various embodiments. One aspect of the techniques herein illustratively involve a remote learning agent that is equipped with a machine learning-based anomaly detection engine, such as DLA 400 shown. Notably, the anomaly detection engine (e.g., DLC 408) may use a set of machine learning models, to detect anomalies at the edge of a local network. For example, DLC 408 may employ an unsupervised machine learning-based anomaly detector that identifies statistical deviations in the characteristics of the network traffic. DLA 400 may also employ a traffic capture mechanism (e.g., NSC 416, etc.) that is in charge of dynamically capturing traffic data of interest.

As described above, architecture 500 may also include an SCA 502 that provides supervisory control over DLA 400 and receives notifications of any anomalies detected by DLA 400. For example, SCA 502 may receive administrative commands and/or parameters from a user interface (UI) process 512 executed by client device 504 or directly on SCA 502. Notably, SCA 502 may generate visualizations for display by UI process 512, thereby allowing an administrator or other user to review the anomaly detection mechanisms in the network. In response, the user may provide feedback regarding any detected anomalies to DLA 400 via SCA 502.

In various embodiments, as detailed below, DLA 400 may execute an adaptive capture filter (ACF) 506 process configured to control the local storage of captured packets on DLA 400. In particular, ACF 506 may operate in conjunction with NSC 416 to store/retain captured traffic packets that are of relevance to an anomaly detected by DLC 408.

Also as shown, SCA 502 may execute a packet capture policy manager 508 and/or a classifier generator 510. Notably, as detailed below, these components may operate in conjunction with feedback from UI process 512 to train and deploy a classifier and packet capture policy for use by ACF 506.

Figure 6:
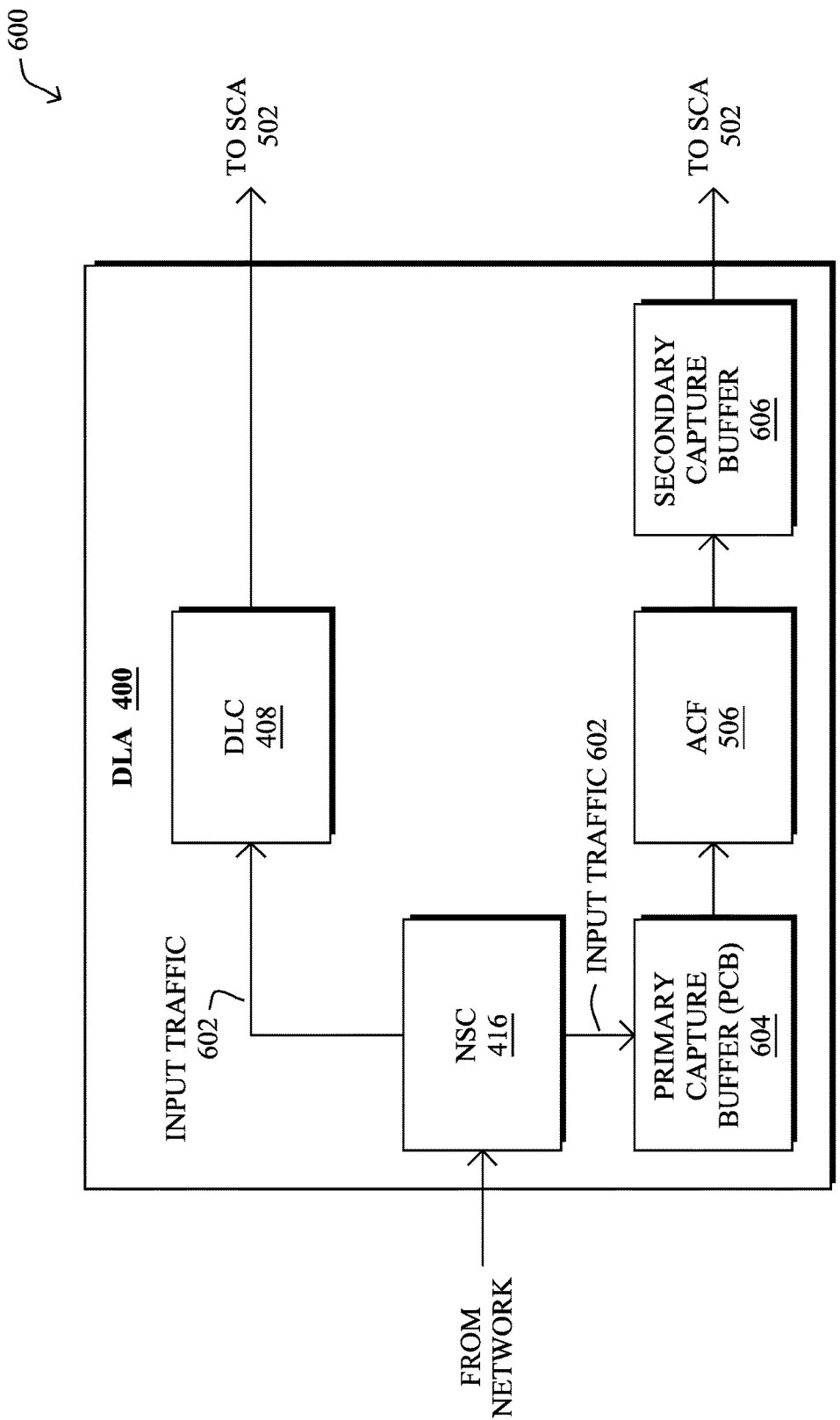
FIG. 6 illustrates an example implementation of a packet storage mechanism.

FIG. 6 illustrates an example implementation of a packet storage mechanism 600, in accordance with various embodiments herein. As shown, NSC 416 or another component of DLA 400 may capture traffic packets from the local portion of the network in which DLA 400 resides. In some cases, NSC 416 may make copies of packets flowing through DLA 400 (e.g., an edge router, etc.). In other cases, NSC 416 may receive the captured packets from one or more other devices in the network.

NSC 416 may provide the input traffic data 602, including any captured packets, to DLC 408 for analysis. In turn, DLC 408 may assess the extracted features using a machine learning-based anomaly detector, to determine whether a network anomaly exists. For example, if the traffic behavior suddenly changes in a statistically significant way, DLC 408 may raise an alert and notify SCA 502 of the detected anomaly.

In some embodiments, NSC 416 or another packet capture mechanism may also provide the captured packets of input traffic 602 to a rotating buffer of captured packets for storage that is called the Primary Capture Buffer (PCB) 604. PCB 604 may be a simple circular buffer which holds the captured packets long enough for the local detection engine, DLC 408, to make its decision about whether the captured traffic is anomalous. Note that such a buffer can be simply dimensioned based on the maximum detection delay of the engine, in some implementations.

When the oldest packets are evicted from PCB 604, they are examined by ACF 506, which will decide whether to discard them or to store them into a secondary capture buffer 606. In greater detail, ACF 506 may decide to accept the packets into buffer 606 if ACF 506 considers that packets pertinent to the context of an anomaly detected by DLC 408. Generally, secondary capture buffer 606 is supposed to store the selected packets until the user confirms or rejects the detected anomaly, which can take potentially minutes, hours, etc.

In one embodiment, every time DLC 408 detects an anomaly, it may notify both the anomaly detection controller (e.g., SCA 502 in the SLN) and ACF 506. In particular, the engine may provide information about the hosts and applications involved in the anomaly, as well as the anomaly time frame. In addition, ACF 506 will also be provided with a machine learning-based characterization of the detected anomaly. This may include, for example, the type of algorithm that detected the anomalies and its associated features.

The goal of ACF 506 is to associate the raised anomaly to a particular traffic class based on its ML details. For each class, a policy is provided that specifies which portion of the captured traffic will need to be preserved. In greater detail, ACF 506 may submit the anomaly detection result/characterization of the detected anomaly to a supervised machine learning-based classifier. Such a classifier may return the identifier of a specific packet capture policy, in various embodiments. Optionally, the classifier can be provided with a safeguard mechanism which ensures that the anomaly falls in a portion of the feature space which is covered by the classifier training set. If this condition is not met, ACF 506 may instead use a default packet capture policy.

In general, a packet capture policy specifies which portion of the traffic associated with an anomaly will need to be captured/retained as part of the anomaly context. For example, a capture policy may specify "all of the traffic sent by the anomaly source" or "all of the traffic exchanged between the anomalous IPs plus all of the DNS traffic sent by the anomalous IPs to any destination." The packet capture policies can also be specified in terms of roles (e.g., "anomaly source," "all anomalous IPs," etc.). In such cases, ACF 506 may replace the roles with the actual IPs in the anomaly context, in order to obtain a valid capture filter. In a further example, the packet capture policy may specify a time period for the packet capture, such as immediately before, during, or slightly after the detected anomaly.

ACF 506 may also periodically refresh secondary capture buffer 606, if anomalies of a particular kind have not arisen lately. This prevents secondary capture buffer 606 from storing packets that it does not need, to make room for newer packets for storage. This can be done, for example, using deep reinforcement learning (DRL), a timer based mechanism, or another machine learning technique.

FIG. 7A-7F illustrate examples of feedback regarding a packet capture policy, according to various embodiments. Another aspect of the techniques herein relates to the processes 508-510 co-located on SCA 502, packet capture policy manager 508 and classifier generator 510. These processes are in charge of creating the supervised anomaly classifier for use by ACF 506 and the list of packet capture policies, as well as installing them onto the DLAs.

At system bootstrapping time, SCA 502 may push a default classifier-policy pair to all of the DLAs. For example, as shown in FIG. 7A, assume that SCA 502 oversees DLAs 400*a*-400*n* (e.g., a first through nth DLA). In such a case, SCA 502 may send the default classifier and policy information to DLAs 400*a*-400*n* via Capture_Policy_Install( ) message 702, which may be sent via unicast, multicast, or broadcast to DLAs 400*a*-400*n*. Such a default policy will typically specify to capture all of the observed traffic or, if this is technically unfeasible due to the system constraints, to capture only the traffic among the anomalous IP addresses. In another embodiment, the model can be bootstrapped by showing to the user a set of pre-recorded anomalies and using their associated feedback as the initial training set for the ACF classifier.

Figure 7C:
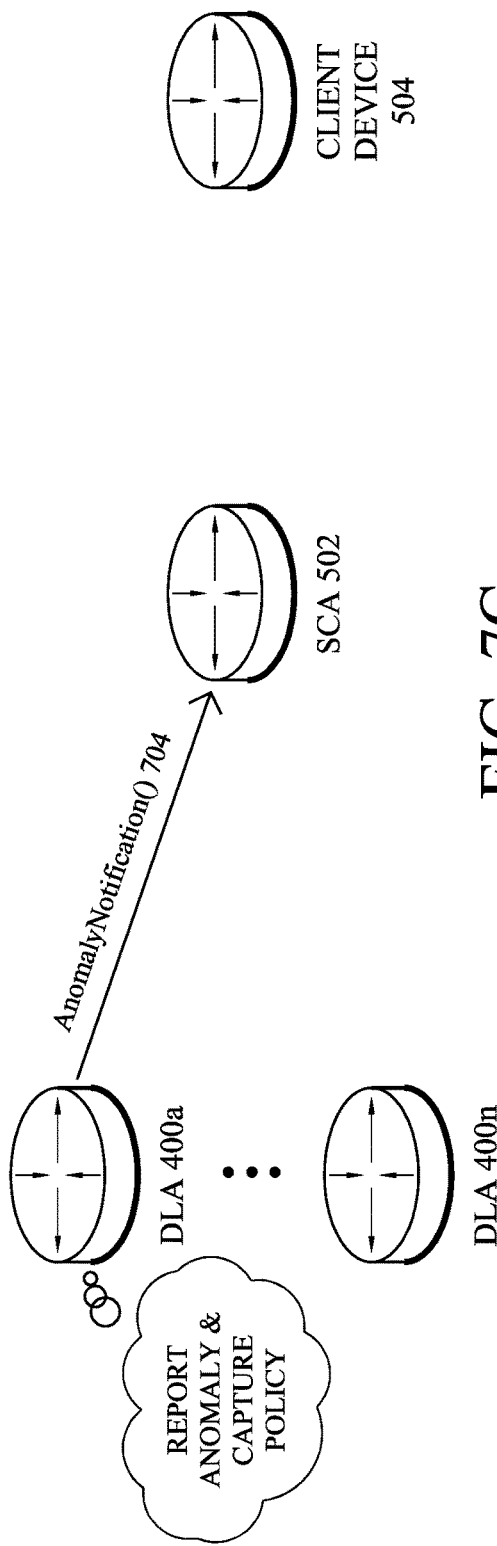

Every time an anomaly is detected by a DLA 400 and confirmed, the traffic selected by ACF 506 may be presented to the user via UI process 512, together with the adopted packet capture policy. For example, as shown in FIG. 7B, assume that DLA 400*a* detects an anomaly by analyzing a set of traffic. In turn, as detailed above, ACF 506 of DLA 400*a* may classify this result to determine the packet capture policy (e.g., the default policy in this example) and store the corresponding packets based on the policy for presentation to the user (e.g., the user of UI process 512 on client 504). As shown in FIG. 7C, DLA 400*a* may also send an AnomalyNotification( ) message 704 to SCA 502 regarding the detected anomaly.

Figure 7D:
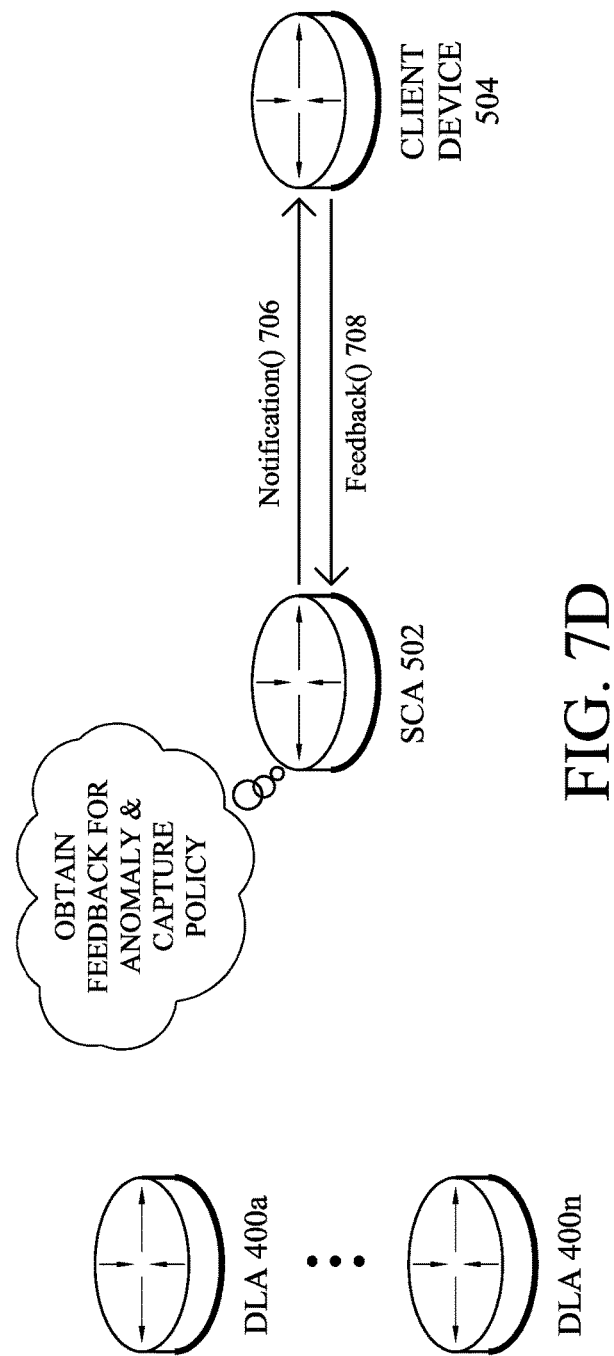

In various embodiments, SCA 502 may seek feedback from the user regarding the packet capture policy employed by DLA 400*a*. For example, as shown in FIG. 7D, SCA 502 may send a Notification( ) 706 to UI process 512 of client 504 (or a local UI process on SCA 502), to present information regarding the detected anomaly to the user. Such information may identify, for example, the detecting device (e.g., DLA 400*a*), the nature of the anomaly, an anomaly score, the packet capture policy employed by DLA 400*a* in response to the anomaly, the captured packets available for inspection (e.g., stored in secondary packet buffer 606 of DLA 400*a*), or any other information regarding the detected anomaly.

In response to reviewing the anomaly information, the user of UI process 512 may provide feedback to SCA 502 via Feedback( ) message 708. Such feedback may specify, for example, the desired packet capture policy for that kind of anomaly or simply a confirmation that the policy chosen by ACF 506 is satisfactory. For example, assume that the user of client 504 wishes to see all DNS-related packet captures, in addition to those retained by DLA 400*a* using its current packet capture policy for the anomaly. In such a case, message 708 may include an indication of the desired policy to SCA 502.

As shown in FIG. 7E, SCA 502 may update the classifier based on Feedback( ) message 708 from UI process 512. Notice that the techniques herein do not require a particular type of machine learning classifier, but can accommodate any number of different types of machine learning mechanisms, such as ANNs and SVMs, to name a few. For example, upon reception of such feedback, SCA 502 may add the {Anomaly Features, Desired Capture Policy} pair to the training set for classifier generator 510, which will be used to compute the ACF classifier. As would be appreciated, the desired traffic policy is used as a label from a machine learning point of view in the classifier.

In FIG. 7F, packet capture policy manager 508 of SCA 502 may send the retrained classifier(s) and labels(s)/policies to DLA 400*a*-400*n*. For example, SCA 502 may send new Capture_Policy_Install( ) message 702 to DLAs 400*a*-400*n* with the updated classifier and policies, for use by their respective ACFs. Such an approach allows a machine learning process, such as a classifier trained on the central controller, to be used at the edge to determine which partner flows (interesting flow) must be kept at the edge of the network according to the type of anomaly.

In yet another embodiment, multiple classifiers may be used to provide the list of traffic characteristics to be used for a given anomaly. For example, it may be desirable to use a first classifier to store a large set of traffic attributes and a second classifier used to store less traffic. For each anomaly the ACF may first use the preferred (first) classifier and upon running out of memory the second classifier may be used (thus storing less traffic for the given anomaly type). Notably, one classifier may be configured to extract a large amount of traffic, while another classifier may be configured to extract a small amount of traffic, and the ACF may switch between the two depending on available resources.

Figure 8:
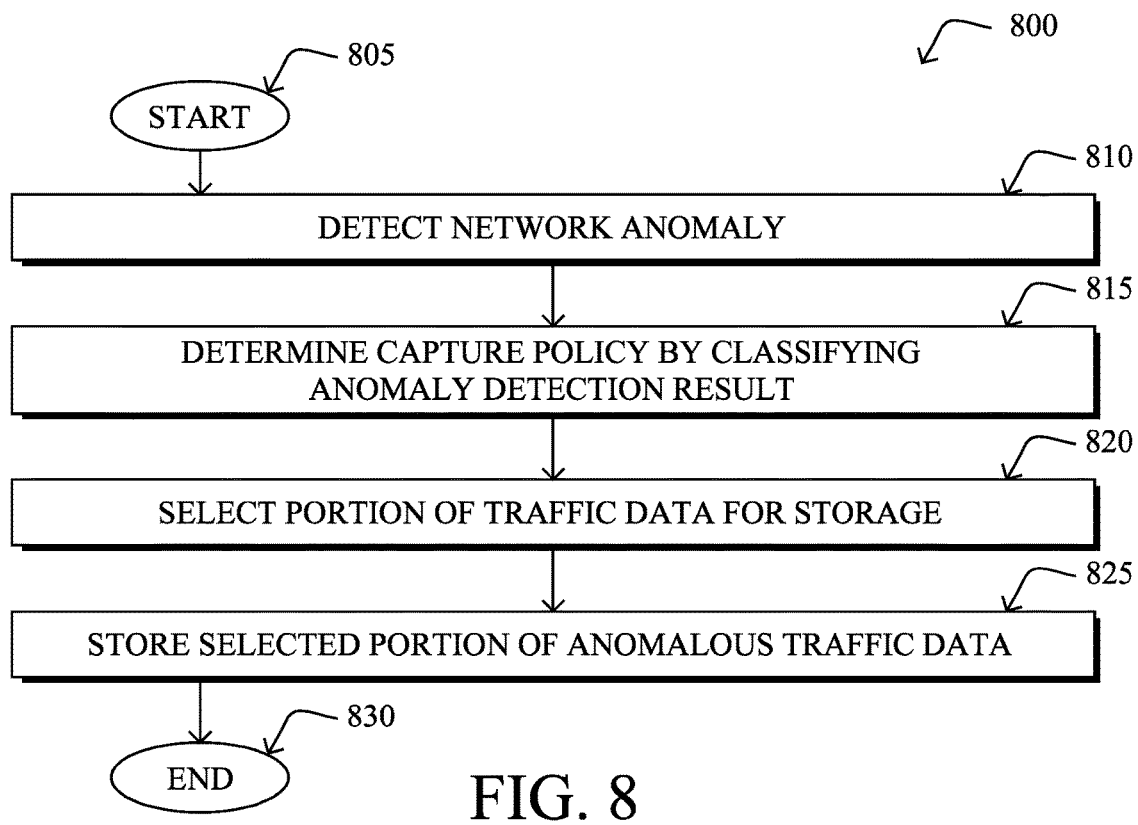
FIG. 8 illustrates an example simplified procedure for applying a packet capture policy.

FIG. 8 illustrates an example simplified procedure for applying a packet capture policy, in accordance with various embodiments herein. Procedure 800 may be performed, for example, by a specialized node in a network such as a DLA or other learning agent. As shown, procedure 800 may start at step 805 and continue on to step 810 wherein, as described in greater detail above, the node may detect a network anomaly by analyzing network traffic using a machine learning-based anomaly detector. For example, the node may analyze any number of features extracted from the network traffic such as, but not limited to, the number of bytes in the traffic flows, the traffic flow durations, the applications or protocols associated with the traffic flows, the traffic flow sources and/or destinations, statistics thereof (e.g., maximums, minimums, averages, etc.), or any other traffic information that may be used to detect anomalous network conditions.

At step 815, as detailed above, the node may determine a packet capture policy for the anomaly by applying a machine learning-based classifier to the anomaly detection results. Notably, different anomalies may have different detector outputs and may require different packet capture policies. For example, one type of anomaly may require the capture of all traffic within a certain time period of an anomaly, whereas another anomaly may require only the packets associated with the source of the anomalous traffic. In some embodiments, the node may employ multiple classifiers, to determine the packet capture policy for the anomaly.

At step 820, the node may select a portion of the captured packets in the traffic data related to the anomaly for storage, as described in greater detail above. In particular, once the node has determined the appropriate packet capture policy, it may apply the policy to the full set of captured packets, to set a portion for retention/storage. For example, if the policy requires storage of DNS-related packets, the node may select such packets related to the detected anomaly for storage. In some cases, the selected portion may include packets from both anomalous traffic flows, as well as from non-anomalous traffic flows. For example, the policy may require storage of all packets to a particular source or destination, if some of the traffic flows associated with the source or destination are deemed anomalous.

At step 825, as detailed above, the node may store the selected portion of the packets for the anomaly. For example, the node may transfer the packets from a first buffer (e.g., a rotating packet buffer used for purposes of anomaly detection) into a second buffer that stores packets deemed relevant to a detected anomaly. Such packets can then be presented, for example, to a user in conjunction with other contextual information regarding the anomaly for inspection. Procedure 800 then ends at step 830.

Figure 9:
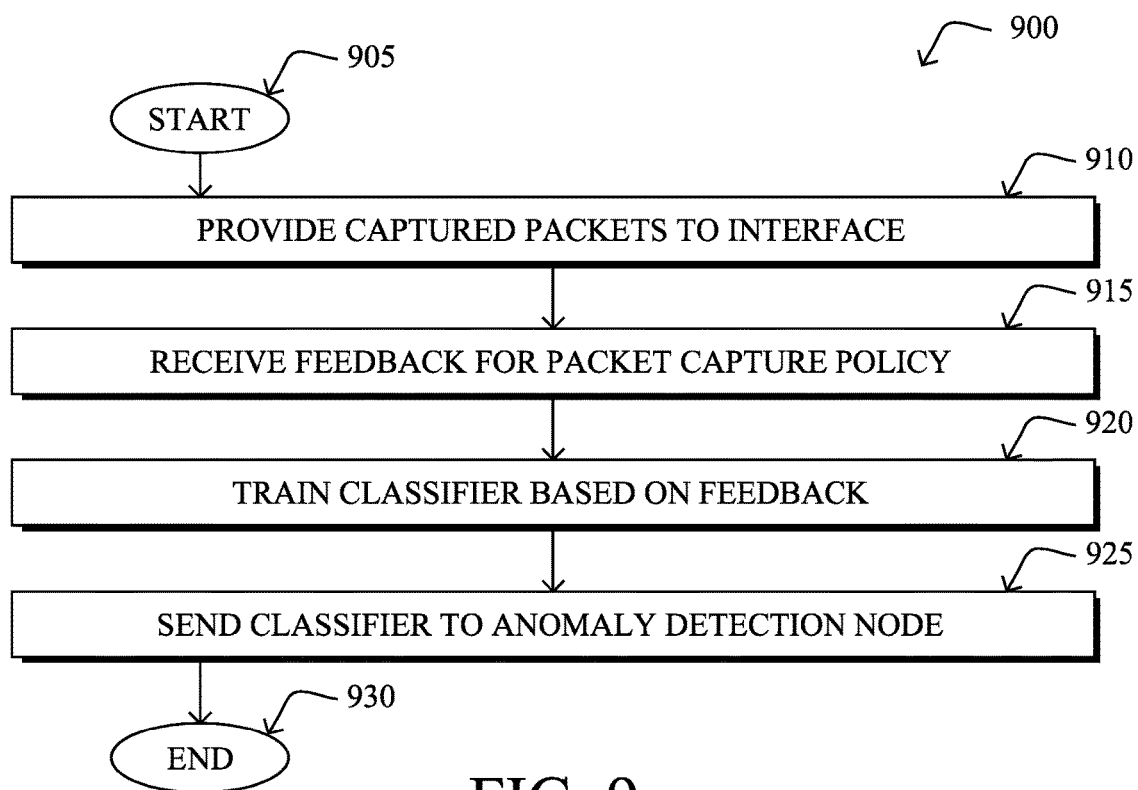
FIG. 9 illustrates an example simplified procedure for deploying a packet capture policy.

FIG. 9 illustrates an example simplified procedure for deploying a packet capture policy, in accordance with various embodiments herein. Procedure 900 may be performed by a specialized networking device, such as a supervisory device in an SLN (e.g., an SCA) by executing stored instructions. Procedure 900 may start at step 905 and continues on to step 910 where, as described in greater detail above, the device may provide captured packets and a packet capture policy to a user interface. Such data may be associated with an anomaly detected by an anomaly detection node in the network that analyzes traffic using a machine learning-based anomaly detector. For example, if such a node detects an anomaly, the device may provide information regarding the anomaly to a user interface, for review by a user. In such cases, the provided information may include packets captured surrounding the anomaly and an indication of the policy used to control which packets were captured/retained for further review.

At step 915, as detailed above, the device may receive feedback from the user interface regarding the packet capture policy. For example, if the user agreed with the packet captured policy used for the anomaly, the feedback may simply comprise an affirmation of the policy. However, if the user disagreed with the policy, such as if the user wished to see other types of packets that may have been relevant to the anomaly but were not retained/stored, the feedback may indicate the new policy, instead.

At step 920, the device may train a machine learning-based classifier based in part on the feedback, as described in greater detail above. In various embodiments, if the feedback indicates that a new policy is needed, the device may use the new policy as a label in a training dataset for a supervised learning classifier (e.g., an ANN, SVM, etc.). Generally, such a classifier may be configured to determine a packet capture policy for a given anomaly, based on the anomaly features/results of a machine learning-based anomaly detector. For example, if a given anomaly is detected, the classifier may determine that particular packet capture policy should be used for the anomaly. By using a classifier to determine the policy, the policy can be applied to other, similar anomalies, as well.

At step 925, as detailed above, the device may send the classifier to the anomaly detection node. In turn, the node may use the classifier to apply the corresponding packet capture policy when future anomalies are detected, so as to store/retain the corresponding packets for review. Procedure 900 then ends at step 930.

It should be noted that while certain steps within procedures 800-900 may be optional as described above, the steps shown in FIGS. 8-9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for adaptive capture of packet traces based on user feedback learning. In particular, the techniques herein alleviate the prohibitive memory and bandwidth requirements involved by the capture of packet level anomaly traces by choosing traffic based on user preference in order to provide contextual information which is targeted to the anomaly type.

While there have been shown and described illustrative embodiments that provide for the adaptive capture of packet traces based on user feedback learning, it is to be understood that various other adaptations and modifications may be made within the spirit and scope of the embodiments herein.

For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   detecting, by a node in a network, an anomaly in the network based on a result of a machine learning-based anomaly detector analyzing network traffic;
   determining, by the node, a packet capture policy for the anomaly by applying a machine learning-based classifier to the result of the anomaly detector, wherein the packet capture policy is adaptive and is updated based on feedback from a user interface, the feedback used to train the machine learning-based classifier;
   selecting, by the node, a set of packets from the analyzed traffic based on the packet capture policy, wherein the packet capture policy specifies, for machine learning-based classifier applied, which portion of the analyzed traffic is to be stored; and
   storing, by the node, the selected set of packets for the detected anomaly.

2. The method as in claim 1, further comprising:
   receiving, at the node, the classifier from a supervisory device configured to train the classifier.

3. The method as in claim 1, wherein the selected packets are associated with both anomalous and non-anomalous traffic flows based on the packet capture policy.

4. The method as in claim 1, wherein the packet capture policy causes the selection of the set of packets based on one or more of: a network address, a traffic type, or a time interval.

5. The method as in claim 1, further comprising:
   storing, by the node, a set of captured packets in a first packet buffer for analysis by the anomaly detector, wherein the selected set of packets are selected from the set of captured packets in the first packet buffer.

6. The method as in claim 5, wherein storing the selected set of packets comprises:
   transferring, by the node, the selected set of packets from the first packet buffer to a second packet buffer.

7. The method as in claim 1, wherein determining the packet capture policy comprises:
   applying, by the node, a plurality of machine learning-based classifiers to the result of the anomaly detector.

8. An apparatus, comprising:
   one or more network interfaces to communicate with a network;
   a processor coupled to the network interfaces and configured to execute one or more processes; and
   a memory configured to store a process executable by the processor, the process when executed operable to:
      detect an anomaly in the network based on a result of a machine learning-based anomaly detector analyzing network traffic;
      determine a packet capture policy for the anomaly by applying a machine learning-based classifier to the result of the anomaly detector, wherein the packet capture policy is adaptive and is updated based on feedback from a user interface, the feedback used to train the machine learning-based classifier;
      select a set of packets from the analyzed traffic based on the packet capture policy wherein the packet capture policy specifies, for machine learning-based classifier applied, which portion of the analyzed traffic is to be stored; and
      store the selected set of packets for the detected anomaly.

9. The apparatus as in claim 8, wherein the process when executed is further operable to:
   receive the classifier from a supervisory device configured to train the classifier.

10. The apparatus as in claim 8, wherein the selected packets are associated with both anomalous and non-anomalous traffic flows based on the packet capture policy.

11. The apparatus as in claim 8, wherein the packet capture policy causes the selection of the set of packets based on one or more of: a network address, a traffic type, or a time interval.

12. The apparatus as in claim 8, wherein the process when executed is further operable to:
   store a set of captured packets in a first packet buffer for analysis by the anomaly detector, wherein the selected set of packets are selected from the set of captured packets in the first packet buffer.

13. The apparatus as in claim 12, wherein the apparatus stores the selected set of packets by:
   transferring the selected set of packets from the first packet buffer to a second packet buffer.

14. The apparatus as in claim 8, wherein the apparatus determines the packet capture policy by:
   applying a plurality of machine learning-based classifiers to the result of the anomaly detector.

15. The apparatus as in claim 8, wherein the apparatus comprises an edge router.

16. A tangible, non-transitory, computer-readable media having software encoded thereon, the software when executed by a processor on a device in a communication network operable to:
   detect an anomaly in the network based on a result of a machine learning-based anomaly detector analyzing network traffic;
   determine a packet capture policy for the anomaly by applying a machine learning-based classifier to the result of the anomaly detector, wherein the packet capture policy is adaptive and is updated based on feedback from a user interface, the feedback used to train the machine learning-based classifier;
   select a set of packets from the analyzed traffic based on the packet capture policy, wherein the packet capture policy specifies, for machine learning-based classifier applied, which portion of the analyzed traffic is to be stored; and
   store the selected set of packets for the detected anomaly.

17. The tangible, non-transitory, computer-readable media as in claim 16, wherein the process when executed is further operable to:
   receive the classifier from a supervisory device configured to train the classifier.

18. The tangible, non-transitory, computer-readable media as in claim 16, wherein the selected packets are associated with both anomalous and non-anomalous traffic flows based on the packet capture policy.

19. The tangible, non-transitory, computer-readable media as in claim 16, wherein the packet capture policy causes the selection of the set of packets based on one or more of:
   a network address, a traffic type, or a time interval.

20. The tangible, non-transitory, computer-readable media as in claim 16, wherein the process when executed is further operable to:
   store a set of captured packets in a first packet buffer for analysis by the anomaly detector, wherein the selected set of packets are selected from the set of captured packets in the first packet buffer.

* * * * *